Figure 1:
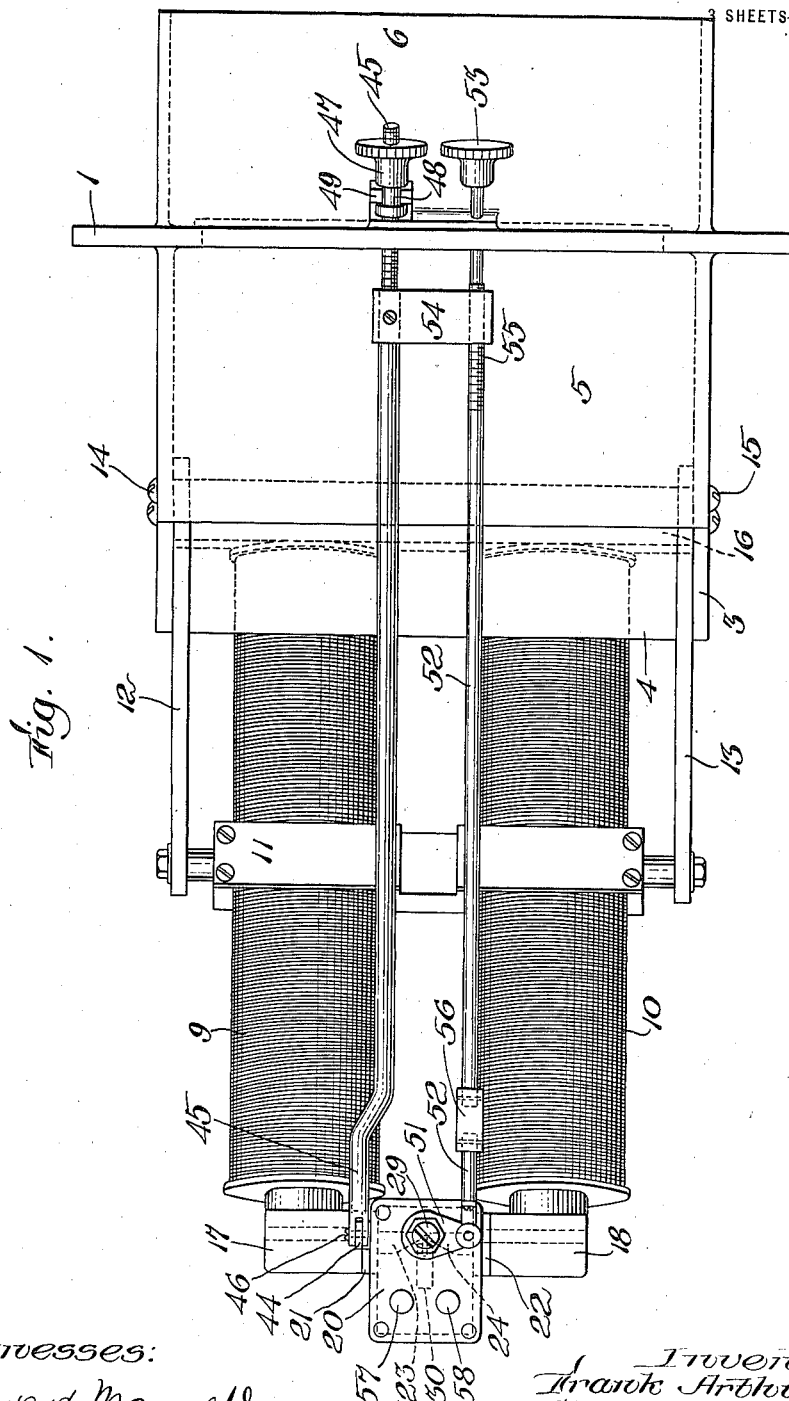

F. A. LAWS & C. L. DAWES.
VOLTMETER.
APPLICATION FILED FEB. 6, 1914.

1,260,982.

Patented Mar. 26, 1918.
3 SHEETS—SHEET 2.

Witnesses:
Edward Maxwell
James R. Hodder

Inventors:
Frank Arthur Laws,
Chester Laurens Dawes,
by Geo. St. Maxwell,
Attorney.

F. A. LAWS & C. L. DAWES.
VOLTMETER.
APPLICATION FILED FEB. 6, 1914.
1,260,982.
Patented Mar. 26, 1918.
3 SHEETS—SHEET 3.
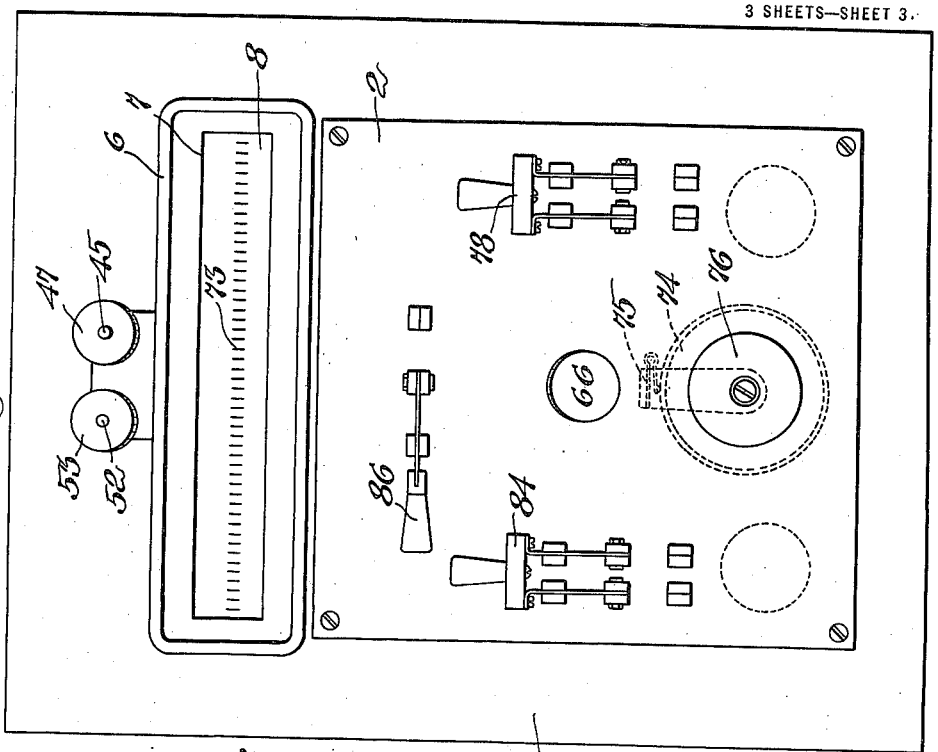
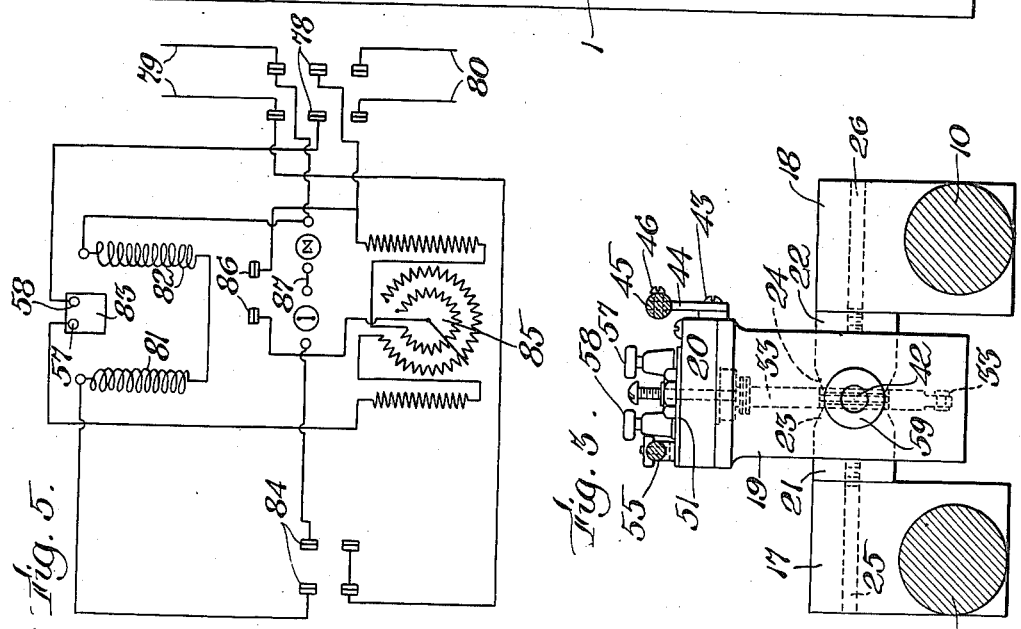
Witnesses:
Edward Maxwell
James R. Hodder
Inventors:
Frank Arthur Laws,
Chester Laurens Dawes,
by Geo. H. Maxwell,
Attorney.

UNITED STATES PATENT OFFICE.

FRANK ARTHUR LAWS, OF SALEM, AND CHESTER LAURENS DAWES, OF CAMBRIDGE, MASSACHUSETTS, ASSIGNORS TO SIMPLEX WIRE AND CABLE COMPANY, OF BOSTON, MASSACHUSETTS, A CORPORATION OF MASSACHUSETTS.

VOLTMETER.

1,260,982.          Specification of Letters Patent.          Patented Mar. 26, 1918.

Application filed February 6, 1914. Serial No. 817,059.

*To all whom it may concern:*

Be it known that we, FRANK ARTHUR LAWS, a citizen of the United States, and resident of Salem, in the county of Essex and State of Massachusetts, and CHESTER LAURENS DAWES, a citizen of the United States, and resident of Cambridge, in the county of Middlesex and State of Massachusetts, have invented an Improvement in Voltmeters, of which the following description, in connection with the accompanying drawings, is a specification, like letters on the drawings representing like parts.

Our present invention is a voltmeter which will accurately and visually show the voltage of either a direct or alternating electrical current, and more particularly to enable the extreme points reached by an alternating voltage wave to be indicated and measured.

Heretofore, voltmeters have been of a type which was incapable of indicating the extreme wave points reached by an alternating voltage, for they have merely indicated the effective value of the voltage wave, without measuring the full amplitude of the wave. With the former type of voltmeter alone, it has been impossible to ascertain the extreme limits of the alternating current wave. Such measurements might be effected by a separate instrument, *i. e.* an oscillograph. As is well known, the voltage wave in an alternating current circuit varies continually, and it is impossible to determine accurately the extreme limit or "peaks" which may be reached, by a measurement of the average or the effective values of the wave. Therefore it has been customary to employ two instruments, a voltmeter and an oscillograph, the latter being of complex mechanism, incapable of being set up, operated and inspected on a switchboard, and requiring expert attendance to have the same properly operate. An important object of the present invention is to provide a voltmeter which will be compact in construction, capable of being utilized directly, or upon a switchboard, and which will accurately and visually show the full amplitude of alternating voltage waves, indicating the extreme limits of the value reached by such waves and to enable the same to be indicated in direct comparison with a voltage scale. It will be appreciated by those skilled in the art that the calibration of an instrument of this general type changes appreciably with change of temperature and from other causes, and therefore we provide means which enables the operator to effect, quickly and accurately, the calibration at any time, by throwing the vibrator circuit on to a source of direct current potential, whose maximum value is given by an ordinary direct-current voltmeter. A further important feature of our invention enables our improved voltmeter to give full-scale deflection at more than one voltage if desired. Thus, if the voltage be so low that the deflection on the scale is too small to be read accurately, this deflection may be doubled by means of the resistance and rheostat hereinafter described. Further, if the voltage be so high that the deflection is not on the scale, the deflection may be halved by said device. Heretofore, alternating-current voltmeters usually employed a scale graduated in divisions depending on the mean square of the voltage, but we use a scale substantially in direct proportion to the voltage, enabling more accurate readings at low values of potential to be made than where a scale depending on the square of the voltage is used. The importance of our invention in indicating accurately, instantly, and continuously the extreme limits of the voltage wave will be appreciated when it is realized that in the former type of voltmeter only the effective value of voltage waves was indicated. In many lines of electrical work, such, for example, as testing cables and other electrical apparatus for dielectric strength and the like, it is the extreme points or limits reached by voltage waves which it is necessary to know, and not merely the effective value of the alternating waves. In making such tests, the insulation must withstand the extreme maximum voltage, and it is the measurement of these extreme limits which our present voltmeter accurately effects, showing the "peaks" of the wave.

The present invention comprises a vibrator through which the alternating currents are conducted, the vibrations being produced by such currents flowing in conductors placed in a magnetic field, and a reflecting device secured to the current conductors is provided to receive and reflect rays of light from a lamp, which rays of light when reflected are projected on a glass or other translucent scale, arranged to be conveniently seen by the operator who, when the instrument is in operation, observes a band of light, the length of which he compares with the voltage marks on the scale. The vibration of the reflector is directly produced by the current passing through the filaments supporting it and is practically proportional to the maximum value of the voltage wave, regardless of wave shape, and the reflected rays of light on the scale are deflected a distance proportional to the extreme extent of the "peaks" reached by said wave, and not to the mere effective value.

Other features of the invention, novel combinations of parts, and details of construction, will be hereinafter more fully pointed out and claimed.

Figure 2:
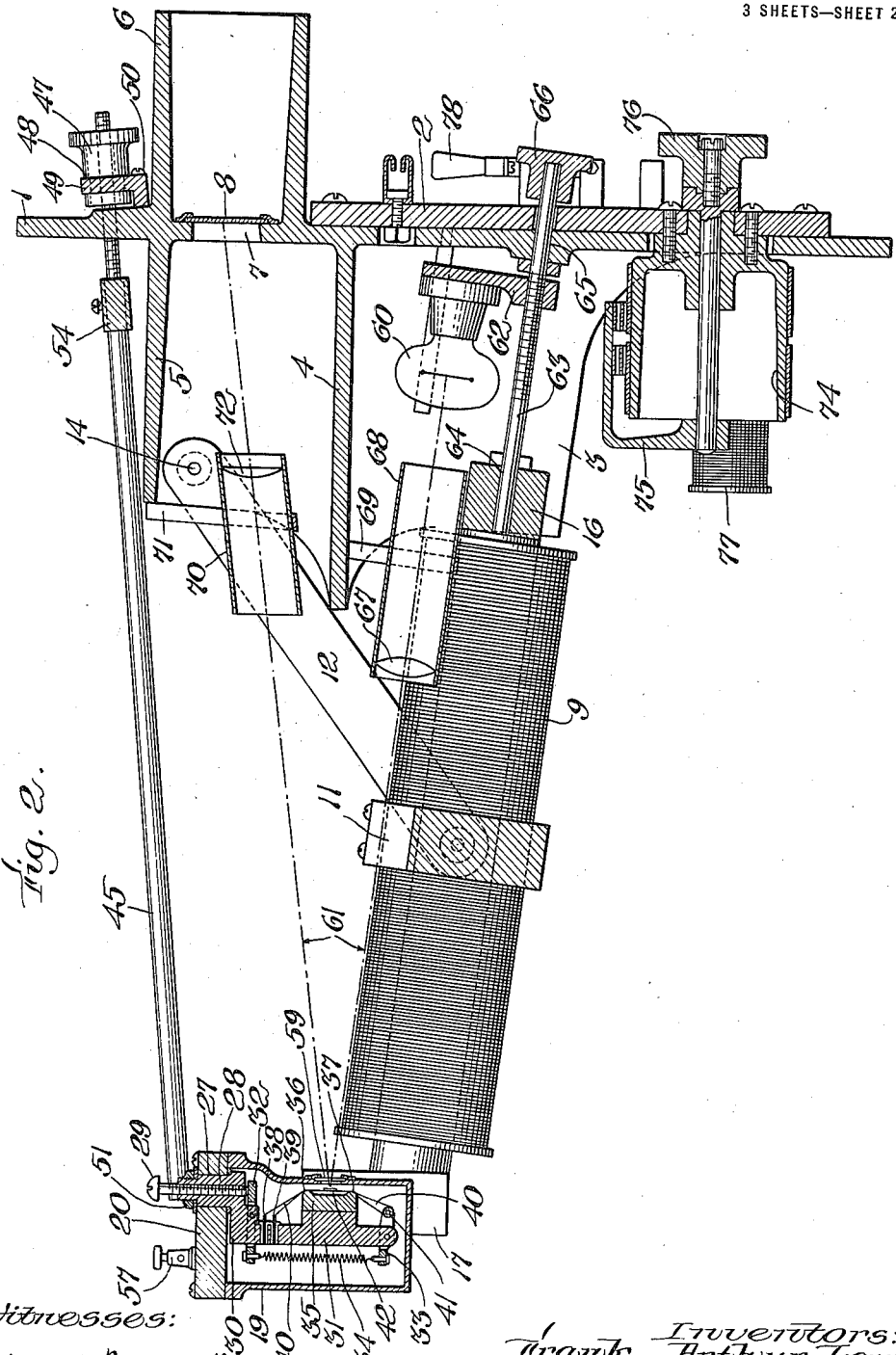

Referring to the drawings, wherein a preferred embodiment of the invention is illustrated, Figure 1 is a plan view of the apparatus;
Fig. 2 is a vertical cross-sectional view;
Fig. 3 is a front view of the vibrator;
Fig. 4 is a front view of the apparatus, showing the switchboard and controlling device; and
Fig. 5 being a diagrammatic view of the wiring.

Our present invention comprises a voltmeter which is so compactly constructed that it may be mounted on a suitable support and attached directly to a switchboard, such support being indicated at 1, to which an insulated plate 2 is secured, carrying the switches, etc.

The support 1 has cast or formed thereon a rearwardly extending bracket 3, carrying a shelf 4 and a top 5, and, at the front of the support opposite thereto, is a sight shade or hood 6, a longitudinal slot 7 being provided through the support 1 and is preferably closed by the ground glass 8 (see Fig. 2). At the rear of the support, we arrange an electromagnet, wound at 9 and 10, held in position by a yoke 11 supported by links 12 and 13 secured to the bracket 3 at 14 and 15 respectively, the forward ends of this magnet being united by a bar 16 and the rear ends comprising pole pieces 17 and 18. Swinging in these pole pieces on trunnions is the container 19 carrying the vibrator. This container comprises the can 19 and cover 20 and carries also coöperating pole pieces 21 and 22, to contact with and constitute a part of the magnet poles 17 and 18 respectively, so that these poles carry the magnetic flux created by the magnet 9, 10 directly into the container 19, the pole pieces being reduced as they approach each other, as indicated in dotted lines at 23 and 24 in Figs. 1 and 3. The pole pieces 17 and 18 are bored, and the corresponding pole extensions 21 and 22 are tapped to receive bolts 25 and 26, which serve to support the container and also act in the nature of trunnions on which the container itself may be tilted during the adjustments to be hereinafter described. The pole pieces 21 and 22 and their respective poles 17 and 18 are arranged to be in a smooth, firm, full contact, so that they each essentially constitute single magnetic poles for the magnet 9, 10, creating an intense magnetic field within the container 19. At the top 20 of the container is a bored orifice 27 through which a bushing 28 passes, having its center threaded to receive a screw 29. The bushing 28 has a rearwardly extending portion 30 within the container and below the top 20, which bushing has a depending extension 31 (see Fig. 2). This portion 31 is drilled near its upper and lower portion to receive pivoted bars 32 and 33 respectively. The bar 32 has one end arranged under the threaded screw 29, so that depression of the screw 29 will tilt the bar 32. The lower end of the depending portion 31 is forked to receive the pivoted lever or bar 33, and a contractile spring 34 connects the levers 32 and 33 as illustrated in Fig. 2. On the front of the depending portion 31 is an insulating block or bridge 35 having slightly projecting bearing points 36 and 37 at its front portion. Through the member 31 are provided two insulated studs 38 and 39, and from one of these a small wire filament 40 is led across the block 35 over the raised supports 36 and 37 around a pulley 41 in the end of the lower lever 33 and back again to the other stud 39, and a mirror 42 is secured to the two portions of the filament which are spaced apart as they are led from the projections 36 and 37. Tightening the screw 29 acts on the upper lever 32 to increase the tension through the spring 34 on the lower lever 33, and consequently to tighten the strip of filament 40. It will be noted that we arrange the mirror 42 in the axial line with the bushing 28, and preferably also in the same horizontal plane with the bolts and trunnions 25 and 26, so that tilting of the container on said trunnions or a rotative movement of the bushing 28 will produce an adjustment on the mirror 42 with said mirror substantially as the center of these motions. In order to effect the adjustment of the container 19 on the trunnions, a screw 43 secures to one side of the container a lug 44, to which a rod 45 is united by a screw 46, the other end of the rod passing through a hole in the support 1 and being threaded through a thumb-nut 47 having a reduced portion 48 engaged by a collar 49 secured to the support 1 by a screw 50, so that manipulation of the thumb-nut 47 will act to move the rod 45 forwardly, or backwardly, and consequently tilt the container and vibrating mirror on the trunnions 25 and 26. In order to effect a rotative adjustment of the vibrator on a vertical axis, the bushing 28 has its top portion reduced and squared to receive a link 51, to which is pivotally attached a rod 52 having its other end extend through the support 1 and keyed to a thumb-nut 53. In order to provide for the rotative adjustment of the bushing 28 relatively with the tilting adjustment of the container effected by the rod 45 as just explained, and so that one adjustment will not be thrown out by the other, we provide a block 54 secured to the rod 45 and having a threaded passage through which a correspondingly threaded portion 55 of the rod 52 is passed, the rod itself passing freely through the support 1. Consequent manipulation of the thumb-nut 53 adjusts the rod 52 relatively with the rod 45 and not with the support 1, both being actuated relatively with the support 1 through the adjustment of the rod 45 already explained. If desired, and for convenience in assembling, we may form the rod 52 in two parts and unite them by a threaded union 56, see Fig. 1. On the top 20 of the container are binding posts 57, 58, to which wires carrying the required current are led, which current is arranged to pass over the filament 40, as already noted.

Direct current being supplied and the magnet 9, 10 energized, the magnetic flux passes within the container, creating a magnetic field in close proximity to the block 35 and filament 40 between the projections 36, and 37. Alternating current now being supplied over the filament 40 will cause the one length of said filament between 36 and 37 to move alternately forward and backward, and simultaneously the other length between said points will move backward and forward, owing to the mutual action of the current and the magnetic field that traverses said filament. This electrical action results in vibrating the mirror as the current alternates, as will be readily understood. We prefer to fill the container 19 with an insulating transparent liquid, and provide a glass window 59 in the front of the container directly adjacent the mirror 42, through which window rays of light from a lamp 60 will be thrown on the mirror 42, and by it reflected again through the liquid and window to the ground glass 8, the lamp being arranged in proper position for the angle of reflection and refraction, as clearly shown in Fig. 2, and as indicated by the dotted line 61. The constant vibration of the mirror 42 will cause the rays of light indicated by 61 to be thrown on the glass 8, showing the maximum value of the voltage wave. The lamp 60 is slidably mounted on a bracket 62, which is carried by a threaded rod 63 passing through suitable bearings at 64 and 65 (see Fig. 2), the latter bearing being in the support 1 and having a thumb-nut 66 to rotate the same outside of the plate 2 and in convenient reach of the operator. Rotation of the thumb-nut 66 and rod 63 acts to move the lamp 60 in forward and back position to adjust the same. We prefer to utilize a lens 67 mounted in a tube 68 held on a support 69 through which the rays of light from the lamp 60 will pass to concentrate them on the mirror 42 in the vibrator, so that the rays of light will be intensified as they are reflected from said mirror. We also prefer to arrange a tube 70 carried on a support 71 and having a cylindrical lens 72 therein through which the reflected rays of light will pass, the cylindrical lens 72 serving to concentrate in a vertical plane the light on the glass 8, while permitting the full amplitude of the vibration to pass freely therethrough without appreciable attention and be shown intensified on the glass 8. Adjustment of the container through the rods 45 and 46 may be made so that the rays of light will be thrown on the glass 8. The glass 8 is preferably provided with a suitable scale 73, graduated in volts, and may have the zero point arranged in the center and receive the beam of light reflected thereon through the vibration of the mirror 42 and the amplitude of vibration may be measured on either side of the zero mark, or the vibrator may be so adjusted that the zero mark may be at one end of the scale 73 and the amplitude of the voltage wave measured, each half of such wave usually being equal.

We also provide means to increase or decrease the current supplied to the vibrator for a given voltage, to take care of any change in the calibration of the instrument, due to variations of temperature and other causes, by passing the current through adjustable resistance. Any suitable, practically non-inductive, rheostat may be provided for this adjustment, that herein shown comprising the members 74 and 75 relatively adjustable with each other through manipulation of the thumb-nut 76 (see Fig. 2). After passing through 74 and 75 the current is led through the fixed resistance 77, and then conveyed to the vibrator. If the voltage to be measured is so high that the deflection does not come on the scale 8, another rheostat and fixed resistance, identical with 74 and 77, may be provided.

We prefer to construct the apparatus so that the vibrator may be connected to either a direct current or an alternating current circuit so that, if desired, the alternating current may be cut out and the direct current substituted in order to calibrate the instrument on the direct-current circuit, the voltage of which, of course, is substantially steady and does not vary from instant to instant, as does the alternating voltage.

Accordingly, we provide a switch to substitute direct current voltage for the alternating current voltage, which is to be measured.

Fig. 5 illustrates in conventional form the wiring for our voltmeter, wherein the switch to cut in either alternating or direct current is indicated at 78, the direct current wires being shown at 79 and the alternating current supply at 80. The wiring for the magnet 9, 10 is indicated at 81 and 82, and the voltmeter itself is shown at 83 with the wires leading to the binding posts 57 and 58. The switch for the current to the magnets and lamp is connected to the direct current wires 79 and is illustrated at 84. 85 is a diagrammatic view of the rheostat and 86 is the switch therefor. A lamp 60 is shown at 87.

The container 19 is preferably a box of non-magnetic material, and the liquid contained therein is a clear, dampening fluid of proper viscosity, and the iron pole pieces within the container serve to concentrate the magnetic flux directly adjacent the vibrating mirror between the supports of the filament 40 over the raised portions 36 and 37, said mirror vibrating only with the movement of the wires to which it is secured and throwing the beam of light indicated by the line 61 to the maximum value of the highest peaks of the voltage wave, indicating the same more fully and accurately than has been possible with the oscillograph, as the contracted beam of light shown on the glass 8 is clearer cut than most oscillograph prints, and of course no scaling is required in our instrument. By adjusting the resistances 74 and 75 with the direct current on, the beam of light shown on the glass 8 may be brought to the value of the exact voltage indicated by a direct-current indicating instrument, and the switch 78 then being thrown to the alternating current, the peak value of the voltage will be similarly indicated on the glass 8 by the extent of the band of light reflected by the mirror 42 during its vibrations.

Having described our invention, what we claim as new and desire to secure by Letters Patent is:

An apparatus for visually indicating the maximum value of an alternating current comprising a plate adapted to be secured to a switchboard and having an opening with a transparent scale adjacent thereto, means secured to the rear of said plate responsive to the instantaneous variations of the current to be measured for projecting a beam of light upon said scale, means operable from the front of said plate for controlling the said current responsive means and for adjusting the position of the focus of the beam on the scale.

In testimony whereof, we have signed our names to this specification, in the presence of two subscribing witnesses.

FRANK ARTHUR LAWS.
CHESTER LAURENS DAWES.

Witnesses:
JAMES R. HODDER,
EDWARD MAXWELL.